United States Patent
Shirvanian

(10) Patent No.: US 8,859,164 B2
(45) Date of Patent: Oct. 14, 2014

(54) BIPOLAR PLATES AND ELECTROCHEMICAL CELLS EMPLOYING THE SAME

(75) Inventor: Alireza Pezhman Shirvanian, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 425 days.

(21) Appl. No.: 13/027,532

(22) Filed: Feb. 15, 2011

(65) Prior Publication Data

US 2011/0183228 A1    Jul. 28, 2011

(51) Int. Cl.
*H01M 8/04* (2006.01)
*H01M 8/24* (2006.01)
*H01M 8/02* (2006.01)

(52) U.S. Cl.
CPC ............ *H01M 8/0206* (2013.01); *H01M 8/026* (2013.01); *H01M 8/04231* (2013.01); *Y02E 60/50* (2013.01); *H01M 8/04179* (2013.01)
USPC ........... 429/514; 429/513; 429/512; 429/457; 429/456; 429/455

(58) Field of Classification Search
CPC ....................... H01M 8/04231; H01M 8/04179
USPC .......... 429/457, 456, 455, 454, 514, 515, 513
See application file for complete search history.

(56) References Cited

U.S. PATENT DOCUMENTS

| | | | |
|---|---|---|---|
| 5,879,828 A | 3/1999 | Debe et al. | |
| 6,706,437 B2 | 3/2004 | Trapp et al. | |
| 7,179,561 B2 | 2/2007 | Niu et al. | |
| 7,351,444 B2 | 4/2008 | Wang et al. | |
| 7,622,217 B2 | 11/2009 | Debe et al. | |
| 2001/0006745 A1* | 7/2001 | Bronoel et al. | 429/32 |
| 2003/0162079 A1* | 8/2003 | Ooma et al. | 429/38 |
| 2004/0058209 A1* | 3/2004 | Benson et al. | 429/25 |
| 2004/0170884 A1 | 9/2004 | Frank et al. | |
| 2004/0191605 A1 | 9/2004 | Kinkelaar et al. | |
| 2005/0221139 A1 | 10/2005 | Hampden-Smith et al. | |
| 2006/0275643 A1 | 12/2006 | Abd Elhamid et al. | |
| 2007/0238010 A1 | 10/2007 | Zhang et al. | |
| 2008/0044711 A1 | 2/2008 | Grafl et al. | |
| 2008/0050643 A1 | 2/2008 | Abd Elhamid et al. | |
| 2008/0095994 A1 | 4/2008 | Jiang et al. | |
| 2008/0299439 A1* | 12/2008 | Wang | 429/34 |
| 2009/0226796 A1 | 9/2009 | Atanasoski et al. | |

FOREIGN PATENT DOCUMENTS

JP          09-283157       * 10/1997  .............. H01M 8/02

* cited by examiner

*Primary Examiner* — Helen O Conley
(74) *Attorney, Agent, or Firm* — Damian Porcari; Brooks Kushman P.C.

(57) ABSTRACT

In one embodiment, a bipolar plate includes a wall area and a landing area defining a fluid flow channel, and a plurality of wires extending from at least one of the landing area and the wall area. In another embodiment, an electrochemical cell includes the aforementioned bipolar plate and a gas diffusion layer (GDL) adjacent the bipolar plate and contacting at least a portion of the plurality of wires.

19 Claims, 6 Drawing Sheets

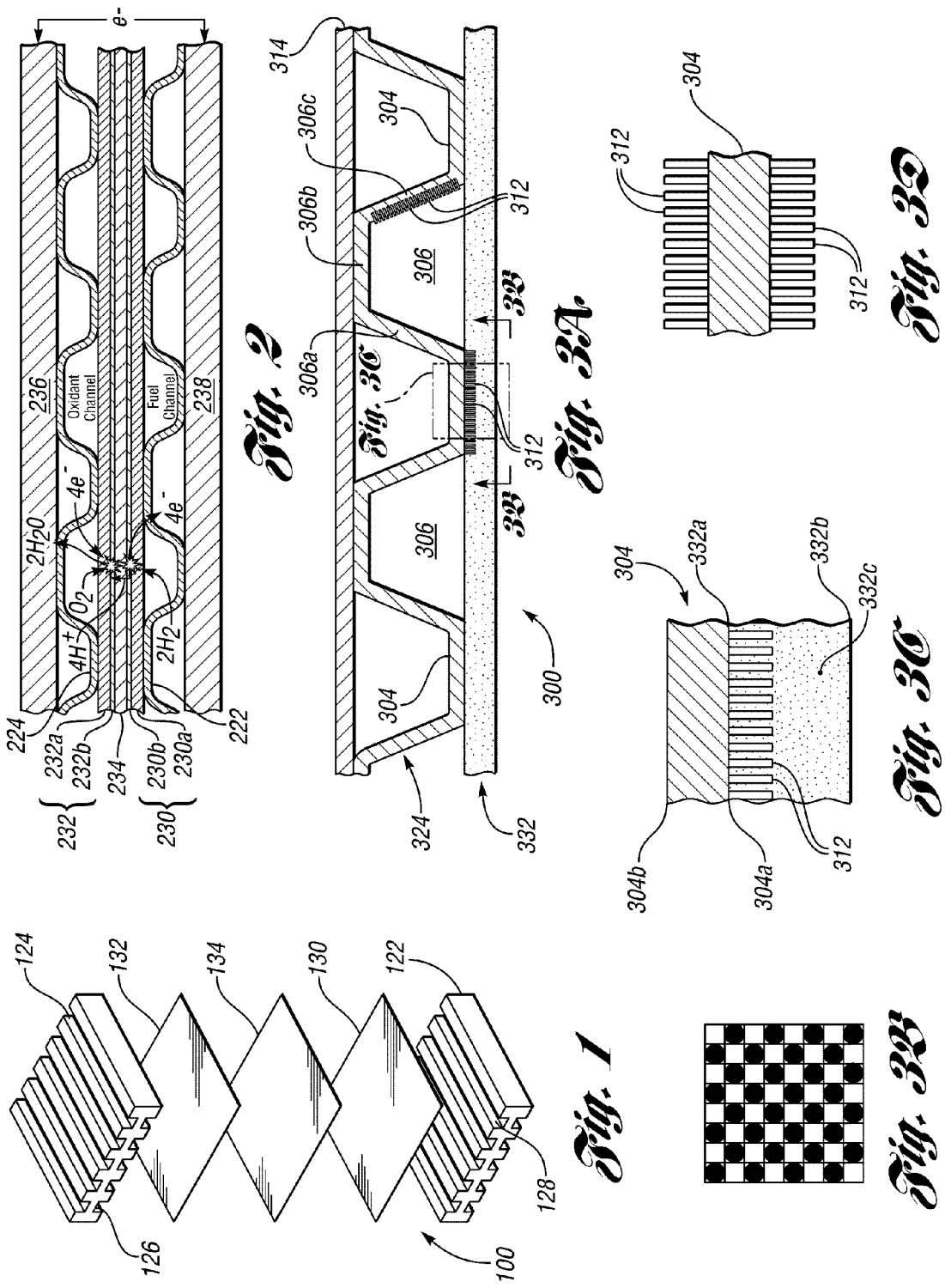

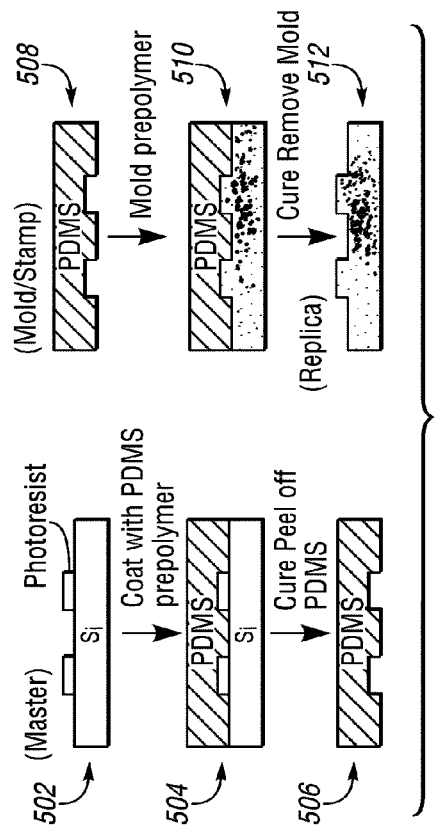
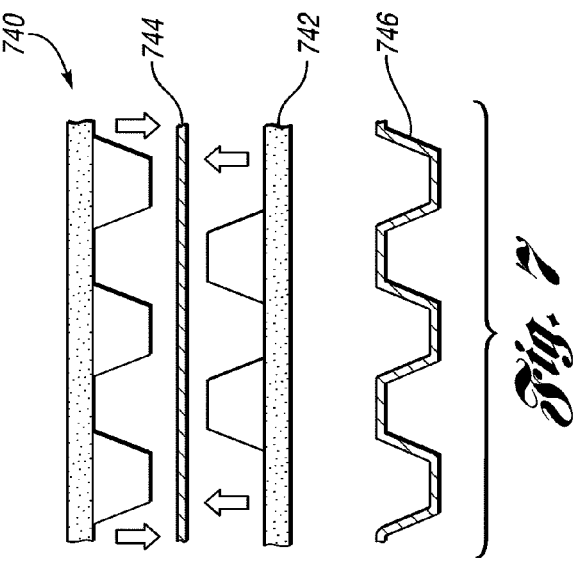
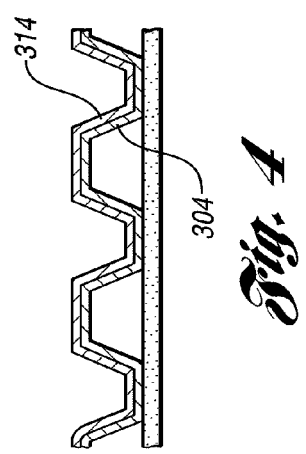
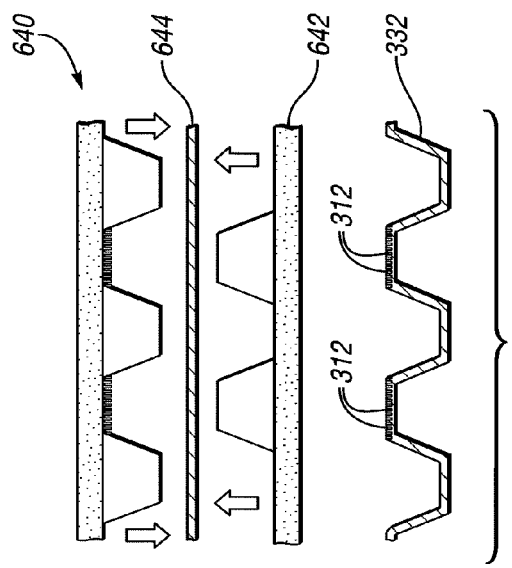

BIPOLAR PLATES AND ELECTROCHEMICAL CELLS EMPLOYING THE SAME

BACKGROUND

1. Technical Field

The present invention relates to bipolar plates and electrochemical cells employing the same

2. Background Art

An electrochemical cell, such as a fuel cell, generally includes two electrodes, two bipolar plates, and an electrolyte. In particular, the two electrodes, an anode and a cathode, are disposed between the two bipolar plates and the electrode. The resulting structure includes, sequentially, a first bipolar plate, an anode, an electrolyte, a cathode, and a second bipolar plate. For greater energy output, one or more such fuel cells may be stacked together to form a fuel cell stack.

In the field of fuel cell technology, there are increasing requirements for fuel cell stacks with greater performance and longer life time. However, conventional bipolar plates have been met with limited use due to prohibitive material cost and/or less than satisfactory performance in thermal and/or electrical conductivities.

SUMMARY

According to one aspect of the present invention, a bipolar plate for use in an electrochemical cell is provided. In one embodiment, the bipolar plate includes a wall area and a landing area together defining a fluid flow channel; and a plurality of wires extending longitudinally from at least one of the landing area and the wall area. In another embodiment, the electrochemical cell includes the bipolar plate and a gas diffusion layer (GDL) contacting at least a portion of the wires. In another embodiment, the GDL includes a GDL surface and a GDL bulk, wherein at least a portion of the wires extend through the GDL surface into the GDL bulk.

In yet another embodiment, the wires are integral to the landing area of the bipolar plate. In yet another embodiment, the wires and the landing area of the bipolar plate are of different materials.

In yet another embodiment, the electrochemical cell further includes a current-collecting plate (CCP) disposed next to the bipolar plate such that the bipolar plate is positioned between the GDL and the CCP. In yet another embodiment, the electrochemical cell further includes a second plurality of wires extending longitudinally towards the CCP from a second surface of the landing area of the bipolar plate. In certain instances, the CCP contacts at least one of the second surface and the second surface of the landing area.

According to another aspect of the present invention, a method is provided for forming an electrochemical cell. In one embodiment, the method includes forming a bipolar plate, the bipolar plate including at least one landing area having a surface, wherein a plurality of wires extending longitudinally from the surface of the at least one landing area.

In another embodiment, the step of forming the bipolar plate further includes a step of forming a molding template having a contour complimentary to a contour of the bipolar plate.

In yet another embodiment, the method further includes a step of stamping a metal plate against the molding template to form the bipolar plate.

In yet another embodiment, the method further includes a step of placing a current-collecting plate (CCP) and a gas diffusion layer (GDL) next to the bipolar plate, such that the bipolar plate is positioned between the CCP and the GDL.

BRIEF DESCRIPTION OF THE DRAWINGS

FIG. 1 depicts an electrochemical cell according to one embodiment;

FIG. 2 depicts a cross-sectional view of the electrochemical cell of FIG. 1;

FIG. 3A depicts an enlarged cross-sectional view of the electrochemical cell of FIG. 2;

FIGS. 3B to 3C depict different parts of the electrochemical cell of FIG. 3A;

FIG. 3D depicts a variation of the electrochemical cell of FIG. 3A;

FIG. 4 depicts another variation of the electrochemical cell of FIG. 3A;

FIG. 5 depicts a non-limiting example method for making wires of an electrochemical cell according to another embodiment;

FIG. 6 depicts a non-limiting example method for making a bipolar plate of an electrochemical cell according to yet another embodiment;

FIG. 7 depicts a variation of the method according to FIG. 6;

FIGS. 9A to 9C depict a schematic view of process steps for forming the pores as a template for the wires according to yet another embodiment;

DETAILED DESCRIPTION

Figure 8A:
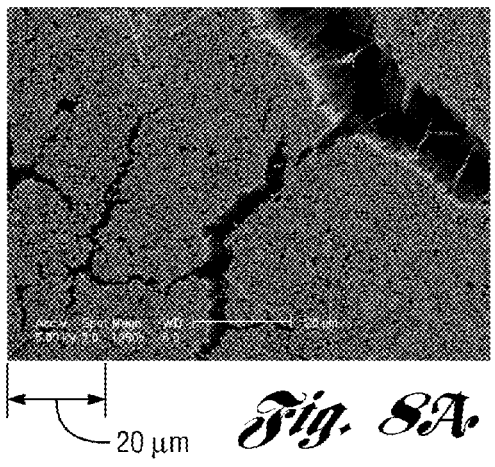
FIGS. 8A to 8E depict SEM (scanning electron microscope) images in increasing magnification of wires generated to enhance the surface area according to the example described herein.
Figure 8B:
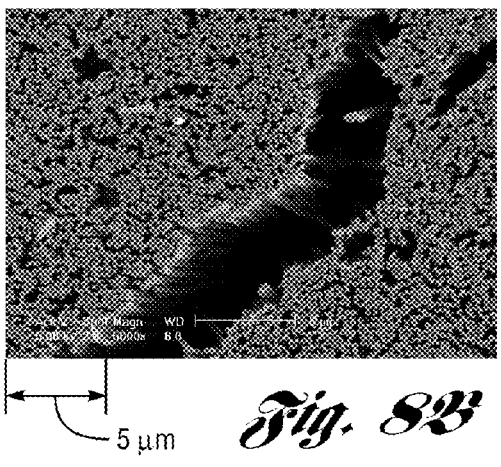
Figure 8C:
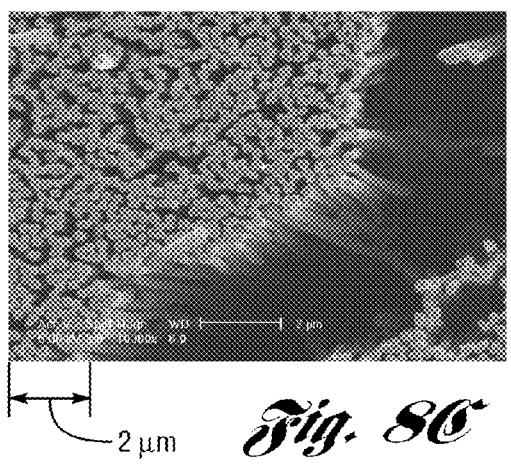
Figure 8D:
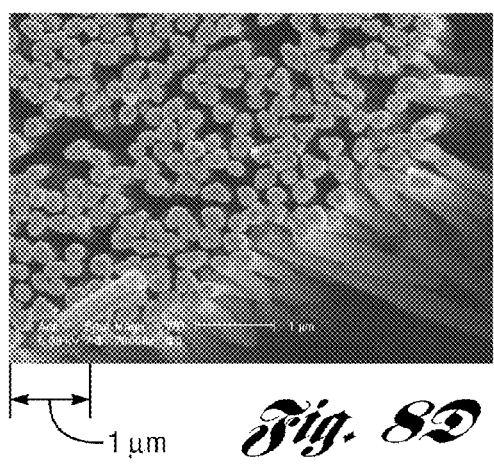
Figure 8E:
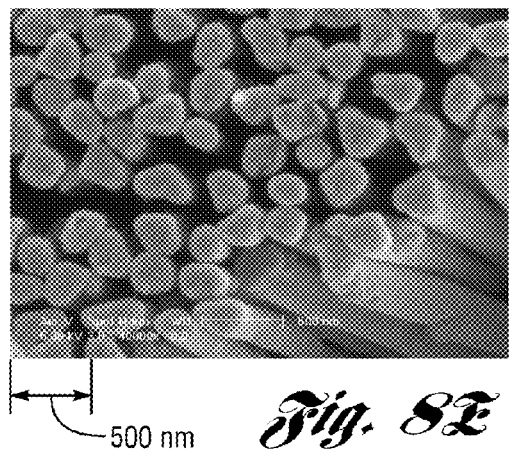

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

In one or more embodiments, the present invention provides an electrochemical cell with relatively increased electronic conductivity, thermal conductivity, or both. A non-limiting example of the electrochemical cell includes a fuel cell, and a hydrogen fuel cell in particular.

In one or more embodiments, the term "electrochemical cell" refers to a device capable of either deriving electrical energy from chemical reactions, or facilitating chemical reactions through the introduction of electrical energy. The electrochemical cell may include a non-rechargeable primary cell, a rechargeable secondary cell, or combinations thereof. For primary cells, when the initial supply of reactants is exhausted, energy cannot be readily restored to the electrochemical cell by electrical means. For secondary cells, chemical reactions may be reversed by supplying electrical energy to the cell, restoring their original composition. One particular example of the electrochemical cell is a fuel cell.

According to one aspect of the present invention, and as depicted in FIG. 1, an electrochemical cell such as a fuel cell is generally shown at 100. In one embodiment, and as depicted in FIG. 1, the fuel cell 100 includes a pair of bipolar plates 122 and 124 having flow channels 126 and 128 formed thereupon, respectively. The flow channels 126, 128 may be formed at a predetermined interval on both sides of each of the bipolar plates 122 and 124. The fuel cell 100 also includes an ionic exchange membrane 134 disposed between the bipolar plates 122 and 124. A first electrode such as an air electrode 132 disposed between the ionic exchange membrane 134 and the bipolar plate 124, and a second electrode such as a fuel electrode 130 disposed between the ionic exchange membrane 134 and the bipolar plate 122. The bipolar plates 122 and 124 electrically connect the first and second electrodes 130, 132, and reduce or prevent fuel and air (an oxidizer) from being mixed. As will be detailed herein below, the flow channels 126 and 128 are used as fuel and air passages in the cells connected end to end. The fuel cell 100 of FIG. 1 may be differed such that the bipolar plate 124 is positioned with a 90-degree turn relative to the bipolar plate 122.

In another embodiment, and as depicted in FIG. 2, a cross-sectional view of the fuel cell 100 of FIG. 1 is generally shown at 200. An ionic exchange membrane 234 is flanked by first and second electrodes 230, 232. In this configuration, the first electrode 230 includes a first gas diffusion layer 230a and a first catalyst layer 230b; and the second electrode 232 includes a second gas diffusion layer 232a and a second catalyst layer 232b. External to the electrodes 230, 232 are first and second bipolar plates 222, 224, respectively. Further external to the bipolar plates 222, 224 are first and second current collection plates 238, 236, respectively.

FIG. 3A depicts an enlarged cross-sectional view of the electrochemical cell of FIG. 1. As depicted in FIGS. 3A to 3D, an electrochemical cell generally shown at 300 includes a bipolar plate 324 having at least one landing area 304 including first and second surfaces 304a, 304b. A gas diffusion layer (GDL) 332 is disposed next to the bipolar plate 324. The GDL 332 has first and second GDL surfaces 332a, 332b defining a GDL bulk 332c in between. There is a plurality of wires 312 extending substantially longitudinally from the first surface 304a into the GDL 332. In certain instances, the wires 312 extend through the first GDL surface 332a into the GDL bulk 332c.

In another embodiment, and as depicted in FIG. 3A, any two adjacent landing areas 304 define a fluid flow channel 306. In a variation, wires 312 may be grown integral of or be attached to any portion of walls 306a, 306b, 306c defining the fluid flow channel 306. In this design, the wires present in and around relevant portions of the walls 306a, 306b, 306c assist with flow area temperature controls and promote water management in the cell. With this design, it is believed that coolant channels can be eliminated all together to reduce construction and maintenance costs.

In one or more embodiments, the term "substantially" refers to an extent of being greater than 75 percent, 85 percent, or 95 percent by weight, volume, length or degree.

In one or more embodiments, the term "wires" includes wires of both nanometer and micrometer scales in length and diameter. The wires 112 can be formed via anodized aluminum oxidation according to the example described herein.

In one or more embodiments, the wires 312 can be formed of any metals, metal alloys, and/or polymers. Non-limiting examples of the materials for forming the wires include gold, ceramics, nickel, steel, copper, iron, cobalt, steel, chromium, plastics, polymers, and alloys and combinations thereof.

In one or more embodiments, the wires 312 are substantially free of any catalytic materials such as platinum, palladium, ruthenium, rhodium, osmium, iridium, gold, silver, or combinations thereof. The term "substantially free" may refer that the above-mentioned catalytic materials are less than 20 percent by weight, 10 percent by weight, 5 percent by weight, 1.5 percent by weight, 0.5 percent by weight, 0.1 percent by weight, 0.05 percent by weight, or 0.001 percent by weight of the total weight of the wires 312.

In certain instances, the wires 312 have a density of 1 to $10^9$ wires per square centimeter of the landing area 304. In certain particular instances, the wires 312 have a density of 1 to $2.5 \times 10^5$ or $10^5$ to $10^7$ wires per square centimeter of the landing area 304.

In certain instances, and as depicted in FIG. 3C, the wires 312 are elongated structures having a cross-sectional dimension "D" smaller than a longitudinal dimension "L". Any two adjacent wires 312 may be spaced apart from each other with a lateral gap "LG". Within the spirit of increasing effective contacting area between the bipolar plate 324 and the GDL 332, the wires 312 can have a cross-section of any suitable shapes, including shapes of round, oval, square, triangle, trapezoid, and combinations thereof, as non-limiting examples. Along the longitudinal dimension "L", the wires 312 may be straight, bent, and/or curved. In addition, the wires 312 may be positioned from each other with a uniform lateral gap "LG" or may be irregularly positioned such that "LG" varies across different regions of the landing areas 324.

In certain instances, the wires 312 have an average aspect ratio of 1 to 200, 1 to 150, 1 to 100, or 1 to 50, with the average aspect ratio referring to an average ratio of longitudinal dimension "L" relative to the cross-sectional dimension "D" as illustratively depicted in FIG. 3C.

In certain instances, the longitudinal dimension "L" of the wires 312 may be 0.1 μm to 1,000 μm, 0.1 μm to 250 μm, or 0.1 μm to 100 μm. In certain other instances, the cross-sectional dimension "D" of the wires 312 may be 0.01 μm to 500 μm, 0.01 μm to 250 μm, or 0.01 μm to 100 μm.

In another embodiment, and as depicted in FIG. 3D, a second plurality of wires 312 may be provided to the second surface 304b of the bipolar plate 332. In this design, the second plurality of wires 312 help increase thermal conductivity and hence relatively improved heat management in the cooling channel portion of the electrochemical cell 300.

In yet another embodiment, and as depicted in FIG. 4, an alternative electrochemical cell generally shown at 400 is depicted to have the coolant channels 306 eliminated from the design. According to this embodiment, the contacting plate 314 may be formed or stamped to have a shape that is substantially a replica of the shape of the bipolar plate 332. With the reduction or elimination of coolant channels, a relatively greater portion or the whole of the contact plate 314 can be used to collect electricity from the GDL, thereby increasing electrical output.

When the wires 312 are provided integral to the landing area 332, the bipolar plate 102 can be produced using stamping or electro-deposition techniques for micro- or nano-fabrication. Non-limiting stamping methods are disclosed in Mirkin et al., "Emerging methods for Micro- and nanofabrication", MRS bulletin, July 2001; Walker et al. "Growth of thin platinum films on Cu (100): CAICISS, XPS and LEED studies", Surface Science 584 (2005) 153-160; Y. Xia et al., "Unconventional methods for fabricating and patterning nanostructures," Chem. Rev., 1999, vol. 99, pp 1823-1848; and Gates et al., "New approaches to nanofabrication, molding, printing and other techniques", Chem. Rev., 2005, vol. 105, pp 1171-1191. The entire contents of these methods are incorporated herein by reference. Nanofabrication methods, such as soft lithography have also been used to transfer an array of openings to a metallic thin film of gold with thickness of 100 nanometers (nm). Non-limiting nanofabrication methods are disclosed in "Patterned transfer of metallic thin film nanostructures by water-soluble polymer templates" authored by C. D. Schaper, Nano Lett., Vol. 3, No. 9, pp 1305-1309, 2003.

The wires 312 can be formed using any suitable methods. A non-limiting example of the methods is via micro/nano-fabrication methods. As depicted in FIG. 5, at step 502, a master mold is formed to have the surface contour of, or be the mirror image, of the wires 312. At step 504, the master mold is covered with PDMS. At step 506, the cured PDMS is removed. At step 508, a third functional material is imprinted onto the PDMS. At step 510, a replica mold is created which is a replication of the master mold, yet in a different material.

As depicted in FIG. 6, a male template 640 includes the replica 510 referenced in FIG. 5 and is complementary to a female template 642. During a stamping process, a metal plate 644 is placed between the male template 640 and the female template 642, and upon pressing, the metal plate 644 is stamped and formed into a bipolar plate having wires 312, such as the bipolar plate 332 referenced in FIG. 3A. In this process, the wires 312 are integral to the bipolar plate 332 and are formed from the same metal plate 644.

In another embodiment, the wires 312 can be attached or placed onto a bipolar plate that has been preformed. As depicted in FIG. 7, a metal plate 744 is stamped between a set of templates 740, 742 without the replica for the wires 312.

In one or more embodiments, and as described herein, there is provided an electrochemical cell with 2 to 6 mm$^2$/mm$^2$ planar area enhancements in surface area at the landing width, an improvement of 45 Volts in the stack voltage at the nominal 1.5 A/cm$^2$ operating condition.

In one or more embodiments, and as described herein, there is provided an electrochemical cell with increased cell and stack thermal conductivity, relatively uniform temperature distribution, providing beneficial impact on the durability and effectiveness of cell components, including the catalyst layer, the membrane, and the GDL, by avoiding periodic hot spots in the fuel cell MEA. Without the wires, the temperature gradient could rise up to about 15 degrees Celsius between the hottest and coolest spots in the same cell. By employing these wires at the landing areas, the temperature gradient can be effectively reduced and better water management in the fuel cell can be achieved. Moreover, enhanced cell conductivity, both thermal and electrical, can assist fuel cell during freeze start. During fuel cell shutdown in subfreezing temperatures, improved cell thermal conductivity can help vaporize and purge the product water within GDL and other components.

In one or more embodiments, and as described herein above, there is provided an electrochemical cell with reduced thermal and/or electrical contact resistance between the GDL and the bipolar plate, and hence relatively better thermal and/or electrical conductivity.

In one or more embodiments, and as described herein above, there is provided an electrochemical cell with improved MEA durability and/or reduced delamination of the membrane and the GDL, possibly via the reduction in temperature gradient. Without wanting to be limited to any particular theory, it is believed that with more uniform temperature distribution within the cell, temperature initiated cyclic expansion and contraction and hence delamination are less likely to occur.

In one or more embodiments, and as described herein above, there is provided an electrochemical cell with improvement in water management. Without wanting to be limited to any particular theory, it is believed that assuming a typical stack operating temperature can approach 80 to 90 degrees Celsius, existence of hot spots within the cell and the stack brings issues for water management. For instance, with a temperature gradient of about 15 degrees Celsius, it is possible to have hot spots with temperatures of above 100 degrees Celsius. At these temperatures, accumulated water may form gaseous water products and therefore, water management may further be complicated. Having an improved control over the temperatures across the components in the cell and the stack can help alleviate these water management issues altogether.

In one or more embodiments, and as described herein above, there is provided an electrochemical cell with the coolant loop at least partially eliminated. The electrochemical cell or the resultant stack is provided with relatively increased thermal conductivity and hence relatively improved temperature control. As a result, the electrochemical cell or the resultant stack does not depend on the coolant loop for temperature controls as much as a conventional cell. In certain instances, the coolant loop may be eliminated altogether to realize more cost benefits and less system complexity.

Having generally described this invention, a further understanding can be obtained by reference to certain specific examples which are provided herein for purposes of illustration only and are not intended to be limiting unless otherwise specified.

EXAMPLE

Example 1

Improved Thermal Conductivity

Figure 11A:
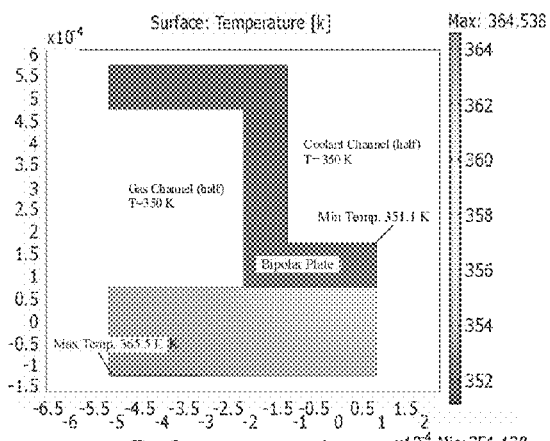
FIGS. 11A and 11B depict contour plots of temperature distribution across domains formed of a partial GDL and a partial bipolar plate according to one example described herein.
Figure 11B:
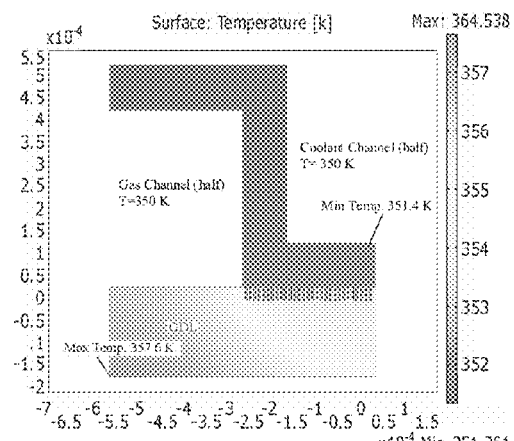

FIGS. 11A and 11B depict contour plots of temperature distribution across domains formed of a partial GDL and a partial bipolar plate. Additionally, convective heat and flow equations are solved within the partial gas channel and the coolant channel. Conduction heat transfer equations are solved in each domain. Also depicted in FIGS. 11A and 11B are temperature gradients between the hottest and coldest regions of the domains without and with wires, respectively. Catalyst layer is modeled as a constant heat flux element in contact with the bottom of the GDL, while the thermal contact resistance between the bipolar plate and the GDL is taken into consideration. The flow in the coolant and the gas channels are assumed to be fully developed.

The wires in FIG. 11B are of needle or rod shape, having dimensions of 5 μm×5 μm×30 μm with center-to-center distance of 10 μm. The wires relate to a surface area enhancement of 6 mm$^2$ per mm$^2$ of planar area of the landing region. As can be seen from FIGS. 11A and 11B, temperature gradient is significantly reduced in the domain with the wires relative to the domain without the wires.

Figure 12A:
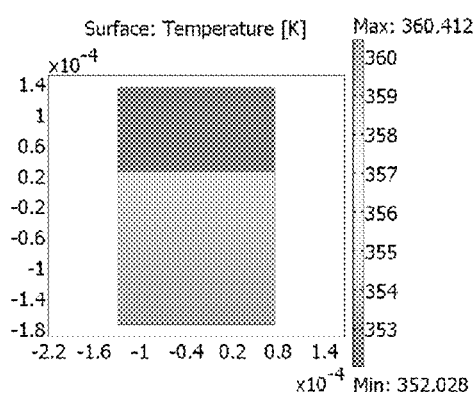
FIG. 12A to 12D depicts temperature contours of a domain that includes a 100 um section of the bipolar plate disposed on top of a 200 um section of the GDL according to another example described herein.
Figure 12B:
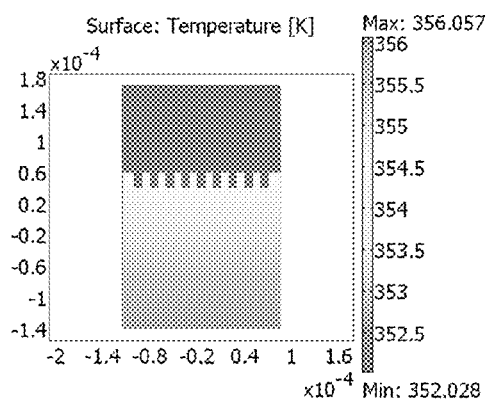
Figure 12C:
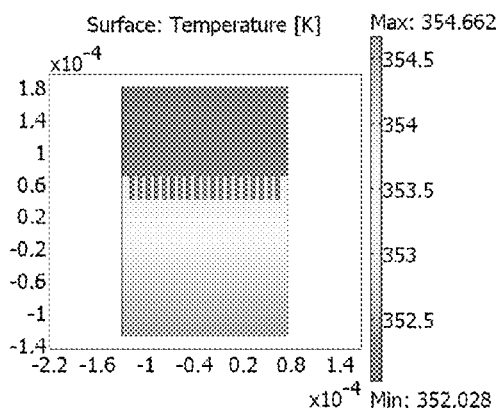
Figure 12D:
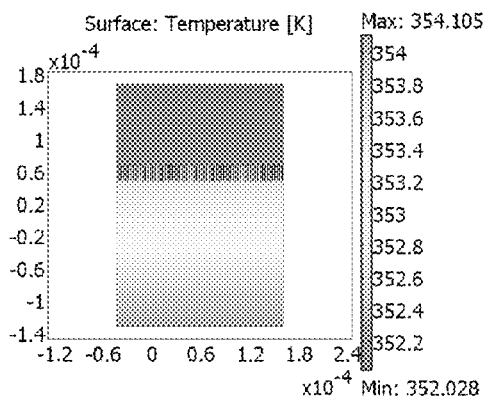

FIGS. 12A to 12D each depict temperature contour of a domain that includes a 100 μm section of the bipolar plate disposed on top of a 200 μm section the GDL. FIG. 12A depicts a temperature gradient of 8.4 degrees Celsius for a domain without the wires. FIG. 12B depicts a temperature gradient of 4.5 degrees Celsius for a domain having wires with dimensions of 10×10×20 with 20 μm center-to-center distance, showing a decrease of 3.9 degrees Celsius in temperature gradient relative to that in FIG. 12A. FIG. 12C depicts a temperature gradient of 2.5 degrees Celsius for a domain having wires with dimensions of 5×5×30 with 10 μm center-to-center distance, showing a decrease of 5.9 degrees Celsius in temperature gradient relative to that in FIG. 12A, or an additional 2.0 degrees Celsius relative to that in FIG. 12B. FIG. 12D depicts a temperature gradient of 2.1 Celsius for a domain having wires with dimensions of 1×1×20 μm with 3 μm center-to-center distance, showing a decrease of 6.3 degrees Celsius in temperature gradient relative to that in FIG. 12A, an additional 2.4 degrees Celsius relative to that in FIG. 12B, or an additional 0.4 degrees Celsius relative to that in FIG. 12C.

Figure 13:
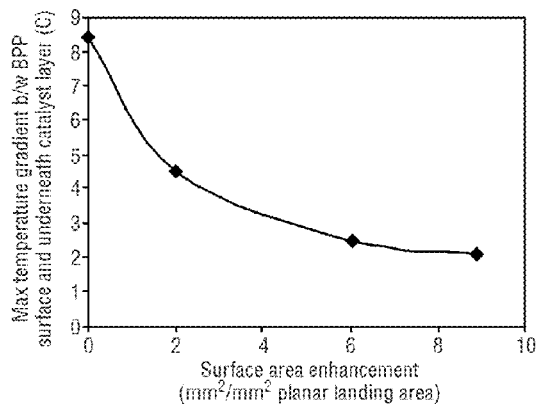
FIG. 13 depicts a plot of maximum temperature gradient as a function of surface area increase in mm2 per mm2 planar landing area.

FIG. 13 shows a plot of maximum temperature gradient as a function of surface area increase in mm$^2$ per mm$^2$ planar landing area. As can be seen from FIG. 13, relative to surface area increases for the initial 6 mm$^2$/mm$^2$, surface area increases greater than 6 mm$^2$/mm$^2$ correspond to much smaller changes in maximum temperature gradients.

Example 2

Electrical Conductivity

Figure 14A:
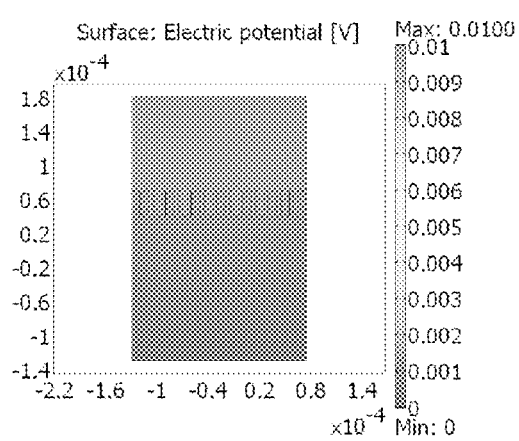
FIGS. 14a to 14b depicts contours of electric potential and electric current in a sample domain according to yet another example described herein.
Figure 14B:
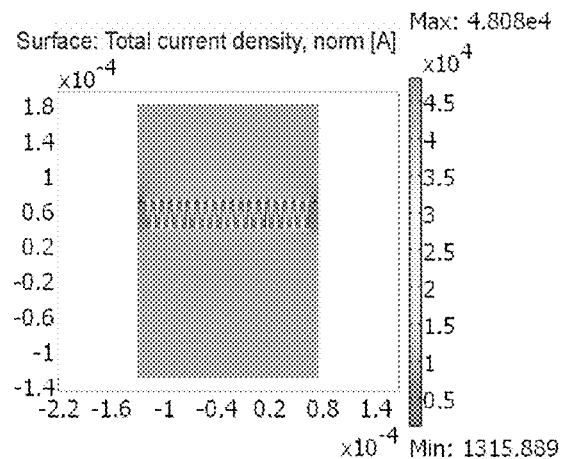

A domain with 200 μm in width of the landing area of the bipolar plate is obtained and subject to a constant voltage of 10 mV across. Ohms law equations are solved for this domain and the electrical current passing through the domain is measured. This current measurement provides conductivity information of the domain, the higher the current, the better the conductivity. The Ohmic resistance is determined by integrating the local current density at any boundary, for instance, on the catalyst layer or on the bipolar plate. The Ohm's law (V=RI) is employed to determine the resistance per unit area of the landing area, which is referred to as the "area specific ohmic resistance (ASR)" with units of Ohm·cm2. For a sample domain without any wires, R is 0.06 Ohm·cm$^2$ wherein $I_{ave}$ is 0.165 A/cm$^2$ and V is $10^{-2}$ volts. For a sample domain with wires having the dimensions of 10×10×20×20, R is 0.023 Ohm·cm$^2$ wherein $I_{ave}$ is 0.435 A/cm$^2$ and V is $10^{-2}$ volts. For a sample domain with wires having the dimensions of 5×5×30 with center-to-center distance of 10 μm, R is 0.001 Ohm·cm$^2$ wherein $I_{ave}$ is 0.965 A/cm$^2$ and V is $10^{-3}$ volts. For a sample domain with wires having the dimensions of 1×1×20×3, R is 5.6×10$^{-3}$ Ohm·cm$^2$ wherein $I_{ave}$ is 1.79 A/cm$^2$ and V is $10^{-3}$ volts. FIGS. 14A and 14B depict contours of electric potential and electric current in the sample domain having the dimensions of 5×5×30×10, respectively.

Figure 15:
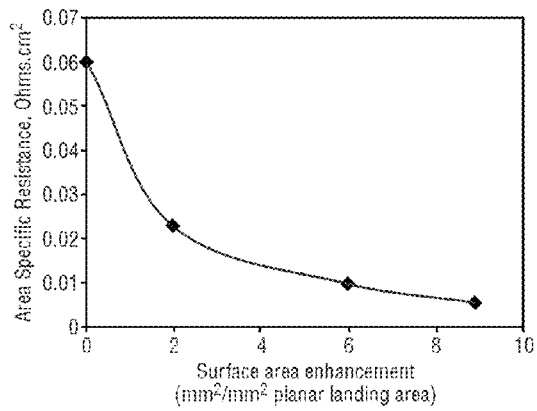
FIG. 15 depicts a plot of area specific resistance as a function of surface area increase in mm2 per mm2 planar landing area.

FIG. 15 shows a plot of area specific resistance as a function of surface area increase in mm$^2$ per mm$^2$ planar landing area. As can be seen from FIG. 15, relative to surface area increases for the initial 6 mm$^2$/mm$^2$, surface area increases greater than 6 mm$^2$/mm$^2$ correspond to much smaller changes in area specific resistance.

Example 3

Evaluating Impact on Overall Voltage Output

Assuming the fuel cell is operating within the Ohmic control region, the voltage and current vary linearly with respect to each other, according to Ohm's law. Therefore, if a stack has n-cells, equivalent to 2n landing area contacts (two for each cell, one for cathode and one for anode), then:

$$V_1 = V_{OCV} - I(n \cdot R_m + 2n \cdot R_{contact})$$

$$V_2 = V_{OCV} - I(n \cdot R_m + 2n \cdot R_{microcontact})$$

Where $R_m$ is the resistance associated with the electrolyte and other miscellaneous components, and $R_{contact}$ and $R_{MicroContact}$ represent resistance at the landing areas without and with the micro/nano structures, respectively. Further assuming in a typical stack, n is 300 and the operating current density of I is 1.5 A/cm$^2$, the enhancements in overall stack voltage will be:

$$V_2 - V_1 = 2nI(R_{contact} - R_{MicroContact})$$

Adopting values for $R_{contact}$ and $R_{MicroContact}$ from FIG. 15 of 0.06 and 0.01, respectively, values for (V2−V1) can be calculated according to the equation V2−V1=2×300×1.5×(0.06−0.01)=45 Volts. It can be seen that by reducing the Ohmic resistances and increasing the cell conductivity using microstructures in this example, the overall voltage output at 1.5 A/cm$^2$ current density is increased by 45 Volts. Based on a typical polarization curve in a single cell, the voltage output V equals 0.6 volts at I of 1.5 A/cm$^2$. For a stack of 300 cells, the collective voltage will be 180 volts, with an increase of 45 volts due to the use of wires. Relative to the 180 volts without the wires, an increase of 45 volts due to the use of wires represents an increase of 25 percent.

Example 4

Forming the Wires

Several methods can be used to manufacture the wires as described herein. Among them are evaporation-condensation, vapor-liquid-solid (VLS) growth, and template based.

In this example, commercially available templates such as anodized alumina membrane (AAM) and radiation track-etched polycarbonate (PC) membranes are used. FIGS. 12A-

12E depict SEM images, with increasing magnification levels, of a plurality of wires grown using an anodic alumina oxide (AAO) membrane.

Figure 9A:
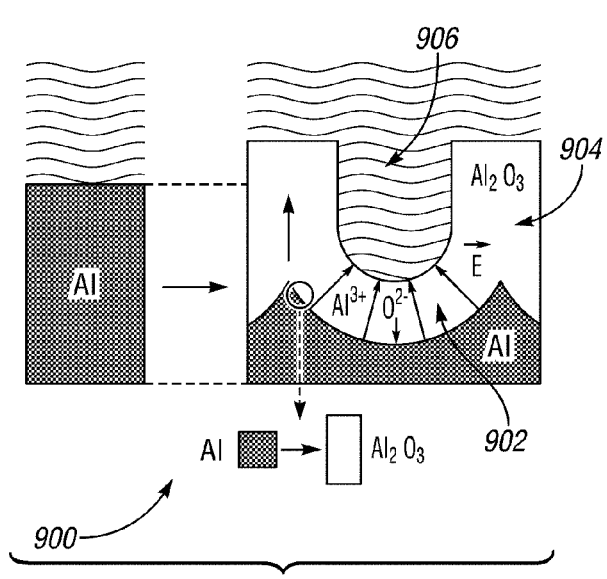
Figure 9B:
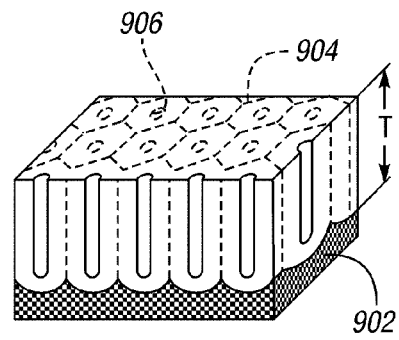

Commonly used alumina membranes having uniform and parallel pores are produced by the anodization of aluminum sheets or films in solutions of sulfuric, oxalic or phosphoric acid. As shown in FIGS. 9A to 9B, the pores 906 can be arranged in a regular hexagonal array as seen in FIG. 9B, and as many as $10^{11}$ pores/cm$^2$ can be obtained. Pore sizes range from nm to 100 μm or larger. After formation of the pores, the barrier oxide layer 902 at the bottom of the pores 906 is removed by dissolution in phosphoric acid and mechanical agitation.

Figure 10A:
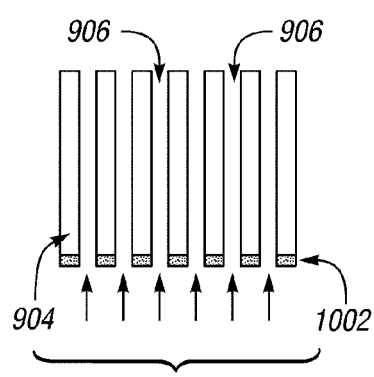
FIGS. 10A to 10D depict a schematic view of process steps for forming the wires using the template of FIGS. 9A to 9C.
Figure 10B:
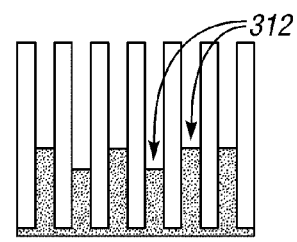
Figure 10C:
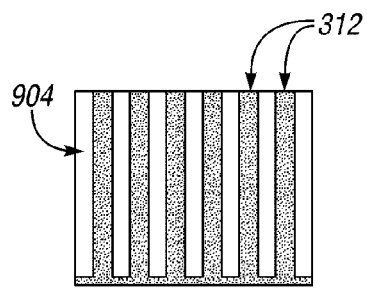
Figure 10D:
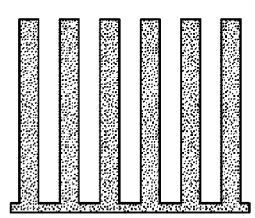

Membrane etching and wire electro-deposition follow thereafter according to FIGS. 10A to 10D. As depicted in FIG. 10A, a conductive layer 1002 of copper or gold is sputtered onto the bottom of the substrate 1004; as depicted in FIG. 10B, the wires 312 extend in length as electro-deposition continues; as depicted in FIG. 10C, the ends of the wires 312 are polished for desirable smoothness; and as depicted in FIG. 10D, the wires 312 are obtained by removing and etching the membrane 1004 by the use of a base such as NaOH.

Example 5

Specifications Testing of the Wires

Copper wires are grown in an electrochemical cell with templates made of Anodic Alumina Oxide (AAO), with pore diameters of 200 nm, 150 nm and 50 nm. Scanning Electron Microscope (SEM) images are shown in FIGS. 8A to 8E. FIGS. 8A to 8E depict an enlarged view of a portion of the landing area of FIG. 3C, the portion containing a plurality of wires extending from a surface of the portion, with a magnification of 1,250×, 5,000×, 10,000×, 20,000×, and 40,000× respectively.

Table I tabulates selected specifications of the wires grown according to the example. Several of the test specifications as referenced in Table I are defined according to the following. With reference to FIG. 9B, a plurality of pores 906 are created within the AAO membrane 904, which is provided with an average thickness indicated as "T." The average thickness "T" of the AAO membrane 904 as employed in this example is about 47-50 μm. For illustration purposes, and as depicted in FIG. 13C, a wire generally shown at 908 is grown to its length "L" within each of the pores 906. The length "L" of the wires 112 can be adjusted by controlling the extent of its growth; however, the length "L" should be no greater than the average thickness "T" for the AAO membrane 904. As referenced in the Table I, pore density is the number of pores 906 per cm$^2$ of the AAO membrane 904. In this example, the growth of the wires 908 can be controlled such that the wires 112 have an average length of 1-1.3 μm. As referenced in the Table I, peripheral area is the area shown at 910; basal area is the area shown at 912; and the total surface area represents the sum of the basal area and the peripheral area times the total number of the wires or the total number of the pores per cm$^2$, plus the free area on the substrate where no wire is grown.

TABLE I

Selected Specifications of the wires Grown

| Pore Diameter nm | AAO Membrane Thickness μm | Pore Density #/cm$^2$ | wire Length μm | Total Surface Area cm$^2$/cm$^2$ growth surface |
|---|---|---|---|---|
| 150 | 50 | $2 \times 10^9$ | 1.3 | 12.2 |
| 73 | 47 | $4 \times 10^9$ | 1 | 9.2 |
| 55 | 50 | $5 \times 10^9$ | 1 | 8.6 |
| 35 | 49 | $1 \times 10^{10}$ | 1 | 11.0 |
| 13 | 50 | $1 \times 10^{11}$ | 1 | 40.8 |

It is noted that the total surface area shown in Table I is a function of the pore diameter, the pore density, and length of the wires grown.

Example 6

Evaluating Wires Size and Density

As detailed herein above, and according to one or more embodiments, an enhancement of 2 to 6 mm$^2$/mm$^2$ in planar landing areas can result in effective thermal management and increased conductivity of the electrochemical cell. The microstructures providing various surface area enhancements as described here could have dimensions of 10×10×20 μm with 20 μm in center-to-center distance or 5×5×30 μm with 10 μm in center-to-center distance. Many other combinations are also possible. Without wanting to be limited to any particular theory, it is believed that the size and density of the wires may be determined based on the surface morphology of a particular GDL, such that the wires and the GDL may form a matching pair that complement each other geometrically with reasonably little destruction to either the GDL or the wires.

Figure 16:
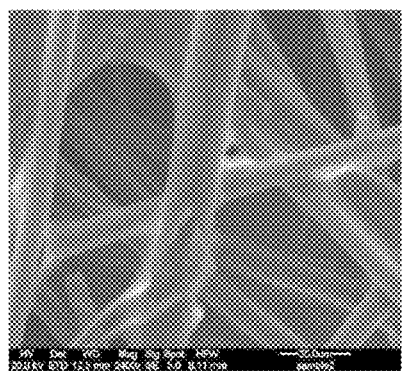
FIG. 16 depicts SEM image of a Toray paper generally used as gas diffusion layer (GDL) material.

For instance, to form a matching pair with a Toray paper with SEM image depicted in FIG. 16, the wires may be designed to have a diameter ranging from 20 to 40 microns and to have a center-to-center distance ranging from 40-60 micron.

While the best mode for carrying out the invention has been described in detail, those familiar with the art to which this invention relates will recognize various alternative designs and embodiments for practicing the invention as defined by the following claims.

What is claimed:
1. A bipolar plate comprising:
   a wall area and a landing area including a first surface and an opposing second surface, together defining a fluid flow channel; and
   a first and second plurality of wires extending from the first and second surfaces, respectively, and being formed of a metal and a metal alloy, and each of the plurality of wires having a density of $10^5$ to $10^7$ wires per square centimeter of the landing area, an average cross-sectional dimension of 0.01 to 500 μm and an average longitudinal dimension of 0.1 to 1,000 μm.
2. The bipolar plate of claim 1, wherein the first and second plurality of wires extend longitudinally from the landing area.
3. The bipolar plate of claim 1, wherein the average longitudinal dimension of each of the first and second plurality of wires is greater than the average cross-sectional dimension of each of the first and second plurality of wires.
4. The bipolar plate of claim 1, further comprising a third plurality of wires extending longitudinally from a first or second surface of the wall area.

5. The bipolar plate of claim 1, wherein the first and second plurality of wires are substantially free of platinum or palladium.

6. The bipolar plate of claim 1, wherein the first and second plurality of wires are integral to at least one of the landing area.

7. The bipolar plate of claim 1, wherein the first and second wires and the landing area are formed of different materials.

8. An electrochemical cell comprising:
a bipolar plate including a wall area and a landing area together defining a fluid flow channel, the landing area having first and second surfaces and a plurality of wires extending from the first or second surface and having a density of $10^5$ to $10^7$ wires per square centimeter of the landing area, an average cross-sectional dimension of 0.01 to 500 μm and an average longitudinal dimension of 0.1 to 1,000 μm; and
a gas diffusion layer (GDL) having a surface and a bulk portion, the plurality of wires extending through the GDL surface and into the GDL bulk portion.

9. The electrochemical cell of claim 8, wherein the plurality of wires is formed of a metal or metal alloy.

10. The electrochemical cell of claim 8, further comprising a current-collecting plate (CCP) adjacent the bipolar plate such that the bipolar plate is positioned between the GDL and the CCP.

11. The electrochemical cell of claim 10, wherein the average longitudinal dimension is greater than the average cross-sectional dimension.

12. A method comprising:
forming a bipolar plate structure including a landing area having first and second surfaces; and
forming a plurality of nanowires onto or into the first and second surfaces of the landing area at a density of $10^5$ to $10^7$ wires per square centimeter of the first and second surfaces of the landing area to form a bipolar plate.

13. The method of claim 12, wherein the step of forming the bipolar plate structure further includes a step of forming a molding template having a contour complementary to a contour of the bipolar plate.

14. The method of claim 12, wherein the step of forming the bipolar plate further includes a step of stamping a metal plate against the molding template to form the bipolar plate.

15. The bipolar plate of claim 1, wherein the first and second plurality of wires each have an average aspect ratio of 50 to 200.

16. The bipolar plate of claim 1, wherein the wall and landing area form a single bipolar plate.

17. The bipolar plate of claim 8, wherein the wall and landing area form a single bipolar plate.

18. The bipolar plate of claim 8, wherein the first and second plurality of wires extend longitudinally away from the first and second surfaces of the landing area.

19. The method of claim 12, wherein the step of forming the plurality of nanowires includes stamping the plurality of nanowires into the first and second surfaces of the landing area.

* * * * *